US008039175B2

(12) United States Patent
Linderoth et al.

(10) Patent No.: US 8,039,175 B2
(45) Date of Patent: Oct. 18, 2011

(54) METHOD FOR SHRINKAGE AND POROSITY CONTROL DURING SINTERING OF MULTILAYER STRUCTURES

(75) Inventors: Søren Linderoth, Roskilde (DK); Peter Halvor Larsen, Roskilde (DK)

(73) Assignee: Technical University of Denmark, KGS, Lyngby (DK)

(*) Notice: Subject to any disclaimer, the term of this patent is extended or adjusted under 35 U.S.C. 154(b) by 1076 days.

(21) Appl. No.: 11/813,798

(22) PCT Filed: Jan. 12, 2006

(86) PCT No.: PCT/EP2006/000229
§ 371 (c)(1),
(2), (4) Date: Aug. 28, 2007

(87) PCT Pub. No.: WO2006/074932
PCT Pub. Date: Jul. 20, 2006

(65) Prior Publication Data
US 2008/0096079 A1   Apr. 24, 2008

(30) Foreign Application Priority Data
Jan. 12, 2005 (DK) .............................. 2005 00056

(51) Int. Cl.
*H01M 8/10* (2006.01)
*B22F 3/11* (2006.01)
*B22F 7/00* (2006.01)
(52) U.S. Cl. ........ 429/535; 429/482; 429/485; 429/496; 429/533; 419/2; 419/8
(58) Field of Classification Search .................. None
See application file for complete search history.

(56) References Cited

U.S. PATENT DOCUMENTS

| | | | |
|---|---|---|---|
| 3,023,492 A | 3/1962 | Bristow | |
| 4,209,147 A | 6/1980 | Jones, Jr. | |
| 4,702,971 A | 10/1987 | Isenberg | |
| 4,957,673 A | 9/1990 | Schroeder et al. | |
| 5,021,304 A | 6/1991 | Ruka et al. | |
| 5,058,799 A | 10/1991 | Zsamboky | |
| 5,064,734 A | 11/1991 | Nazmy et al. | |
| 5,162,167 A | 11/1992 | Minh et al. | |
| 5,358,735 A | 10/1994 | Kawasaki et al. | |
| 5,368,951 A | 11/1994 | Shiratori et al. | |
| 5,670,270 A | 9/1997 | Wallin | |
| 5,702,837 A | 12/1997 | Xue | |
| 5,788,788 A | 8/1998 | Minh | |
| 5,803,934 A | 9/1998 | Carter | |
| 5,846,664 A | 12/1998 | Third et al. | |
| 5,908,713 A | 6/1999 | Ruka et al. | |
| 6,017,647 A | 1/2000 | Wallin | |
| 6,048,636 A | 4/2000 | Naoumidis et al. | |
| 6,099,985 A | 8/2000 | Elangovan et al. | |
| 6,232,009 B1 | 5/2001 | Batawi | |
| 6,248,468 B1 | 6/2001 | Ruka et al. | |
| 6,280,868 B1 | 8/2001 | Badwal et al. | |
| 6,458,170 B1 | 10/2002 | Visco et al. | |
| 6,479,183 B2 | 11/2002 | Tsukuda et al. | |
| 6,592,787 B2 | 7/2003 | Pickrell et al. | |
| 6,605,316 B1 | 8/2003 | Visco et al. | |
| 6,682,842 B1 | 1/2004 | Visco et al. | |
| 6,783,880 B2 | 8/2004 | Christiansen | |
| 6,843,960 B2 | 1/2005 | Krumpelt et al. | |
| 6,844,099 B1 | 1/2005 | Gorte et al. | |
| 6,878,651 B2 | 4/2005 | Crosbie | |
| 6,936,217 B2 | 8/2005 | Quadadakkers et al. | |
| 6,958,196 B2 | 10/2005 | Gorte et al. | |
| 7,351,488 B2 | 4/2008 | Visco et al. | |
| 2001/0029231 A1 | 10/2001 | Gorte et al. | |
| 2002/0045090 A1 | 4/2002 | Oyanagi et al. | |
| 2002/0048699 A1 | 4/2002 | Steele et al. | |
| 2002/0122967 A1 | 9/2002 | Gorina et al. | |
| 2002/0127455 A1 | 9/2002 | Pham et al. | |
| 2002/0182468 A1 | 12/2002 | Janousek et al. | |
| 2003/0015431 A1 | 1/2003 | Barker et al. | |
| 2003/0035989 A1 | 2/2003 | Gorte et al. | |
| 2003/0040420 A1 | 2/2003 | Larsen et al. | |
| 2003/0059335 A1 | 3/2003 | Quadadakkers et al. | |
| 2003/0059668 A1 | 3/2003 | Visco et al. | |
| 2003/0082434 A1 | 5/2003 | Wang et al. | |

(Continued)

FOREIGN PATENT DOCUMENTS

CA   2440288   3/2004

(Continued)

OTHER PUBLICATIONS

United States Patent Office Action for U.S. Appl. No. 11/813,074 dated Jan. 10, 2011 (13 pages).
United States Office Action for U.S. Appl. No. 11/815,025 dated Jan. 26, 2011 (5 pages).
Japanese Patent Office Action for Application No. 2007-550754 dated Feb. 8, 2011 (9 pages) with English translation.
United States Patent Office Notice of Allowance for U.S. Appl. No. 11/813,074 dated Apr. 15, 2011 (2 pages).
European Patent Office Search Report for European Application No. 062024339 dated Feb. 2, 2007 (2 pages).
International Search Report and Written Opinion from International Searching Authority for PCT/EP2005/013968 dated Mar. 28, 2006 (10 pages).
International Preliminary Report on Patentability from International Searching Authority for PCT/EP2005/013968 dated Mar. 30, 2007 (10 pages).
International Search Report and Written Opinion from International Searching Authority for PCT/EP2006/000920 dated Sep. 22, 2006 (10 pages).

(Continued)

*Primary Examiner* — Robert Hodge
(74) *Attorney, Agent, or Firm* — Michael Best & Friedrich LLP

(57) ABSTRACT

The present invention provides a method for producing a multilayer structure, comprising the steps of: providing a composition comprising a Fe—Cr alloy powder and at least one of the oxides of Fe, Cr, Ni, Co, Zn, Cu; forming a first layer of said composition; forming at least one additional layer on one side of said first layer; heat treating said layers in an oxygen-containing atmosphere; and sintering in a reducing atmosphere so as to provide a final alloy, wherein the amount of Fe in the final alloy of the first layer after the sintering step is in the range of from about 50-90% by weight, based on the total weight of the final alloy.

10 Claims, 2 Drawing Sheets

U.S. PATENT DOCUMENTS

| | | |
|---|---|---|
| 2003/0134171 A1 | 7/2003 | Sarkar et al. |
| 2003/0145525 A1 | 8/2003 | Rosenflanz |
| 2003/0165726 A1 | 9/2003 | Robert et al. |
| 2003/0178307 A1 | 9/2003 | Sarkar |
| 2003/0186101 A1 | 10/2003 | Christansen et al. |
| 2003/0224234 A1 | 12/2003 | Steele et al. |
| 2003/0231973 A1 | 12/2003 | Krumpelt et al. |
| 2003/0232230 A1 | 12/2003 | Carter et al. |
| 2003/0235752 A1 | 12/2003 | England et al. |
| 2004/0033405 A1 | 2/2004 | Barnett et al. |
| 2004/0043269 A1 | 3/2004 | Taniguchi et al. |
| 2004/0053101 A1 | 3/2004 | Chartier et al. |
| 2004/0060967 A1 | 4/2004 | Yang et al. |
| 2004/0115503 A1 | 6/2004 | Jacobson et al. |
| 2004/0169064 A1 | 9/2004 | Rinne et al. |
| 2004/0173666 A1 | 9/2004 | Fukunaga et al. |
| 2004/0183055 A1 | 9/2004 | Chartier et al. |
| 2004/0209147 A1 | 10/2004 | Finkenwirth et al. |
| 2005/0064220 A1 | 3/2005 | Hasz |
| 2005/0089739 A1 | 4/2005 | Seccombe et al. |
| 2005/0181253 A1 | 8/2005 | Finnerty et al. |
| 2006/0024547 A1 | 2/2006 | Waldbillig et al. |
| 2006/0147782 A1 | 7/2006 | Reisdorf et al. |
| 2006/0257703 A1 | 11/2006 | Qi et al. |
| 2006/0280998 A1 | 12/2006 | Ying et al. |
| 2007/0040003 A1 | 2/2007 | Rinne et al. |
| 2007/0269701 A1 | 11/2007 | Larsen et al. |
| 2008/0118635 A1 | 5/2008 | Larsen |
| 2008/0124602 A1 | 5/2008 | Larsen et al. |
| 2008/0142148 A1 | 6/2008 | Nielsen et al. |
| 2008/0166618 A1 | 7/2008 | Larsen et al. |

FOREIGN PATENT DOCUMENTS

| | | |
|---|---|---|
| CA | 2596173 | 8/2006 |
| CN | 1409427 | 4/2003 |
| CN | 1997229 | 7/2007 |
| DE | 4237602 | 5/1994 |
| DE | 19650704 | 6/1998 |
| DE | 19710345 | 1/1999 |
| DE | 19836132 | 2/2000 |
| EP | 0446680 | 9/1991 |
| EP | 1065020 | 1/2001 |
| EP | 1255318 | 11/2002 |
| EP | 1306920 | 5/2003 |
| EP | 1318560 | 6/2003 |
| EP | 1383195 | 1/2004 |
| GB | 1313795 | 4/1973 |
| GB | 2400723 | 10/2004 |
| JP | 02-019406 | 1/1990 |
| JP | 08-222249 | 8/1996 |
| JP | 09-050812 | 2/1997 |
| JP | 9-274921 | 10/1997 |
| JP | 2001335388 | 12/2001 |
| JP | 2002-329508 | 11/2002 |
| JP | 2003-528979 | 9/2003 |
| JP | 2003-282068 | 10/2003 |
| JP | 2003-331856 | 11/2003 |
| JP | 2004-119108 | 4/2004 |
| JP | 2004152585 | 5/2004 |
| JP | 2004319286 | 11/2004 |
| KR | 10-0464607 | 1/2005 |
| WO | WO 92/15122 | 9/1992 |
| WO | WO 98/49738 | 11/1998 |
| WO | 9956899 | 11/1999 |
| WO | 01/72456 | 10/2001 |
| WO | WO 02/09116 | 1/2002 |
| WO | WO 02/45198 | 6/2002 |
| WO | WO 02/073729 | 9/2002 |
| WO | WO 03/036739 | 5/2003 |
| WO | WO 03/069705 | 8/2003 |
| WO | WO 03/075382 | 9/2003 |
| WO | WO 03/105252 | 12/2003 |
| WO | WO 04/001885 | 12/2003 |
| WO | WO 2004/013925 | 2/2004 |
| WO | WO 2004/030130 | 4/2004 |
| WO | WO 2004/030133 | 4/2004 |
| WO | WO 2004/079033 | 9/2004 |
| WO | WO 2005/122300 | 12/2005 |
| WO | WO 2006/069753 | 7/2006 |
| WO | WO 2006/079558 | 8/2006 |
| WO | WO 2006/082057 | 8/2006 |
| WO | WO 2007/025762 | 3/2007 |

OTHER PUBLICATIONS

International Search Report and Written Opinion from International Searching Authority for PCT/EP2006/000813 dated Mar. 29, 2006 (10 pages).

International Preliminary Report on Patentability from International Searching Authority for PCT/EP2006/000813 dated May 18, 2007 (10 pages).

International Search Report and Written Opinion from International Searching Authority for PCT/DK2005/000379 dated Dec. 16, 2005 (14 pages).

United States Office Action for U.S. Appl. No. 11/814,356 dated May 1, 2008 (7 pages).

International Search Report from International Searching Authority for PCT/EP2006/008537 dated Aug. 8, 2007 (3 pages).

United States Office Action for U.S. Appl. No. 11/570,320 dated May 26, 2009 (15 pages).

Notice of Allowability with Office Action for U.S. Appl. No. 11/814,356 dated Jul. 6, 2009.

United States Office Action for U.S. Appl. No. 11/814,356 dated Jan. 26, 2009 (7 pages).

Donald, I.W. "Preparation, properties and chemistry of glass and glass-ceramic-to-metal seals and coatings," J. Mat. Sci. (1993) 28:2841-2886.

Dyck, C.R. et al., "Synthesis and characterization of $Gd_{(1-x)}Sr_xCoO_{(1-y)}Fe_yO_{(3-\delta)}$ as a cathode material for intermediate temperature solid oxide fuel cells," Mat. Res. Soc. Symp. Proc. (2004) 801:113-118.

Gut, B. et al., "Anode supported PEN for SOFC. Pressed substrates for spray pyrolysed and co-sintered electrolyte; redox stability and alternative anode," Jahresbericht (2001) 1-6.

Kim, J.H. et al., "Fabrication and characteristics of anode-supported flat-tube solid oxide fuel cell," J. Power Sources (2003) 122(2):138-143.

Klemensø, T. et al., "The mechanism behind redox instability of anodes in high-temperature SOFCs," Electrochemical Society Journal (2005) 152(11):A2186-A2192.

Matus, Y. et al., "Metal-supported solid oxide fuel cell membranes for rapid thermal cycling," Solid State Ionics (2005) 176:443-449.

Nadler, J.H. et al., "Oxide reduction and sintering of Fe-Cr alloy honeycombs," J. Mat. Research (2003) 18(8):1787-1794.

Xia, C. et al., "Functionally graded cathodes for honeycomb solid oxide fuel cells," Electrochem. Solid-State Letters (2002) 5(10):A217-A220.

Young, R.C. et al., "Symposium BB: Materials and Technologies for a Hydrogen Economy," Materials Research Society Symposium Proceedings Series (Nov. 30, 2003) pp. 709-717.

Zhang, Y. et al., "Redox cycling of Ni-YSZ anode investigated by TPR technique," Solid State Ionics (2005) 176:2193-2199.

International Search Report and Written Opinion from International Searching Authority for PCT/EP2006/000229 dated Mar. 15, 2006 (9 pages).

Han, M-F. et al., "Manufacturing processes of solid oxide fuel cell," China Academic Journal Electronic Publishing House (2001) 10:1195-1198.

United States Patent Office Action for U.S. Appl. No. 11/813,074 dated May 19, 2010 (11 pages).

United States Patent Office Action for U.S. Appl. No. 11/815,025 dated May 26, 2010 (7 pages).

United States Patent Office Action for U.S. Appl. No. 11/944,133 dated Jun. 22, 2011 (14 pages).

United States Patent Office Action for U.S. Appl. No. 11/815,025 dated Aug. 11, 2011 (7 pages).

METHOD FOR SHRINKAGE AND POROSITY CONTROL DURING SINTERING OF MULTILAYER STRUCTURES

CROSS-REFERENCE TO RELATED APPLICATIONS

This patent application is a national stage filing under 35 U.S.C. 371 of International Application No. PCT/EP2006/000229, filed 12 Jan. 2006, which claims foreign priority to Denmark Patent Application No. PA 2005 00056, filed 12 Jan. 2005, the disclosures of which are incorporated by reference herein in their entireties.

The invention relates to a method for producing a multilayer structure. The shrinkage and porosity of the different layers during the sintering can be controlled. The obtained multilayer structure may, for example, be employed in solid oxide fuel cell (SOFC) applications.

PRIOR ART

WO 99/56899 relates to porous metal-containing materials for uses including filters, electrodes for batteries and fuel cells, light weight structural materials, heat exchangers and catalysts. The metal-containing materials are obtained by a method a green form metal oxide is sintered, followed by chemical reduction to a metallic form with only a low, or negligible, level of shrinkage during processing, provided that the sintering step is conducted under conditions to promote vapour phase sintering.

EP-A-1065020 discloses a metal porous body having a skeleton which has a foam structure, is composed of an alloy composed mainly of Fe and Cr and includes a Cr carbide and/or FeCr carbide uniformly dispersed therein. The metal porous body is obtained by preparing a slurry mainly composed of a Fe oxide powder having an average particle size of not more than 5 μm, at least one powder selected from among metallic Cr, Cr alloy and Cr oxide powders, a thermosetting resin and a diluent; applying this slurry onto a foamed resin core body, followed by drying, and afterwards forming a metal porous body by firing in a non-oxidizing atmosphere, including heat-treatment at 950° C. to 1350° C.

US 2001/0046608 A1 relates to an improved porous article obtained by mixing ceramic or metal particles and pliable organic hollow spheres in a liquid, followed by pressing, slip casting, extruding or injection molding the mixture. Afterwards, the article is dried to remove the liquid, followed by sintering, resulting in a strong porous article having uniformly spaced interconnected voids.

US 2002/0182468 A1 discloses a current collector made from ferritic iron alloy comprising more than 68% by weight of Fe and standard impurities; 22-32% by weight of Cr; 1 to 10% by weight of Mo; and 0.01 to 1.5% by weight of at least one material selected from the group consisting of yttrium, rare earth metals, and oxides thereof. The ferritic iron alloy is particularly suitable as a material for current collectors used in SOFC solid electrolyte high-temperature fuel cells.

US 2003/0059335 A1 discloses a high temperature material comprising a chromium oxide forming an iron-based alloy containing 12 to 28 wt % chromium, 0.01 to 0.4 wt % La, 0.2 to 1.0 wt % Mn, 0.05 to 0.4 wt % Ti, less than 0.2 wt % Si, less than 0.2 wt % Al with the property that a temperatures of 700 to 950° C., said high temperature material is capable of forming at its surface a $MnCr_2O_4$ spinel phase. The high temperature material is suitable as a bi-polar plate of a high temperature fuel cell.

U.S. Pat. No. 6,682,842 B1 teaches a composite electrode/electrolyte structure, comprising a gas impermeable electrolyte membrane; and a porous electrode in contact with the membrane, the electrode comprising a porous structure consisting essentially of a metal alloy selected from the group consisting of a low chromium ferritic steel, an intermediate-chromium ferritic steel, a high-chromium steel, a chrome-based alloy and a chrome-containing nickel-based alloy, and an electrocatalyst precursor dispersed within the pores of the porous structure.

US 2004/0183055 A1 discloses a method for preparing a thin solid-state composition, essentially formed from a ceramic and/or metallic material (A) having, within said composition, a surface concentration gradient of a ceramic and/or metallic material (B) of chemical composition identical to or different from that material (A). The method comprises the steps of (1) infiltrating a porous pore-forming substrate of controlled thickness with a suspension of a material (A) in a solvent; (2) solvent evaporation in order to form a pore former/material (A) composite structure; (3) debinding; (4) sintering or presintering; (5) partial or total filling of the porosity created on the surface material (A) by material (B) or in a precursor of said material (B), followed by an optional heat treatment; and (6) sintering or cosintering the assembly.

US 2003/0231973 A1 relates to a method for preparing compositionally graded metallic plates suitable for use as interconnects for solid oxide fuel cells. The method comprises the steps of (1) obtaining a powder of a predefined composition, (2) adding solvents, dispersants, a plasticizer and organic binder to said powder to form a slip; (3) forming said slip into a layer on a substrate; (4) removing said layer from the substrate and burning out said binder; and (5) sintering said layer in a reducing atmosphere. Materials for the metallic plates are for example ferritic stainless steel, or a Fe—Cr—La—Y—Sr alloy.

U.S. Pat. No. 6,048,636 relates to an electrode for a fuel cell which has a porous self-supporting layer and another layer with catalytic properties disposed on said self-supporting layer. The self-supporting layer consists of a cermet comprising $Al_2O_3$ or $TiO_2$ to which Ni is admixed.

U.S. Pat. No. 5,846,664 discloses a process for the manufacture of porous metal components having controlled microporosity and macroporosity. Said process comprises the steps of (1) preparing a colloidal suspension comprising at least one metal powder having a particle size less than 300 microns, such as Ni, Cu, Co, Mo, Ti, Fe and any fine metal-containing powder; (2) casting said colloidal suspension into a thin sheet; (3) drying the sheet; (4) layering a predetermined number of tape layers, and compacting said layers at pressures ranging from between 5 to 60 MPa at temperatures in the range of between 25 to 80° C. for a time effective to form a green body; and (5) heating said green body at a controlled rate, at temperatures effective to remove the pyrolysable additives and then further heating to sintering temperatures in the range of between 700 to 1400° C. to thereby form a metal component.

"Oxide reduction and sintering of Fe—Cr alloy honey combs" by Jason H. Nadler et al discloses regular metallic honeycomb structures with greater strength-to-weight ratios than random metallic foams, making them useful in areas in which the strength and ductility of metals are required in combination with low overall density, for example light-weight load-bearing structures, heat and sound ablators, and buoyant structures. A process for fabricating metal honeycomb has been developed, in which a paste of ceramic powders, binders and lubricants are extruded through a die. The extruded shape is subsequently sintered and reduced to metal by heat treating in hydrogen.

The advantages of the above described method over known powder metallurgical processes are low material costs, ceramic powders of fine grain size are more easily obtained, which facilitates more rapid alloy homogenization, ceramic powders are safer to handle than metal powders, and ceramic powders are more stable during formation of water-based extrudable pastes.

Several oxide mixtures have been investigated so as to determine the feasibility of their direct reduction to form metal honeycombs. Among these alloys are compositions which are reduced to stainless steels, nickel-based superalloys, maraging steels, and copper-based alloys.

Gurevich et al. have made calculations on hydrogen reduction of $FeO$—$Cr_2O_3$ mixtures at several temperatures that indicated that iron-chromium solid solutions could be formed with $Cr_2O_3$ contents as high as 20 wt. %. They have determined that if spinel-structures $FeCr_2O_4$ solid solutions were formed during reduction then, the system became reduced to $Fe+Cr_2O_3$ with some chromium passing into solid solution with Fe.

Chinje and Jeffes have investigated iron-chromium sesquioxide [(Fe, $Cr)_2O_3$] reduction in $CO/CO_2$ and $H_2/H_2O$ atmospheres, evaluating compositions with chromia contents up to 30 w. %. During the reduction, four phases were observed: (Fe, Cr) 203, $FeCr_2O_4$, FeO with a limited extent of chromium substitution for iron, and an Fe—Cr. Chinje and Jeffes indicted that as chromium substituted for iron in a wüstite (FeO) lattice, the stability of wüstite against reduction was increased.

Kedr observed a decrease in the extent of reduction of (Fe, $Cr)_2O_3$ solid solutions after heat treatment (1200° C. in 20 h) with increasing chromium concentrations. These observations also showed a decrease in reduction rate with $Cr_2O_3$ concentrations up to 2.5 wt. % while an increase in reduction rate, attributed to increased porosity was observed with $Cr_2O_3$ concentration up to 10 wt. %.

The presence of iron metal surrounding the oxide grains has been interpreted to act as a diffusion barrier to the reducing gas. $Cr_2O_3$ has been reported to be more susceptible to reduction when the resulting metal can mix with iron metal. The microstructures of these Fe—Cr alloys after heat treatment and reduction of constituent oxides are often plagued by porosity and unreduced particles of oxide-artifacts that are deleterious to the mechanical properties of the final alloy. These defects have been attributed to extensive densification occurring prior to complete reduction, hampering reaction between hydrogen and interior oxide particles.

OBJECT OF THE PRESENT INVENTION

It is the object of the present invention to provide a method for producing a multilayer structure whereby the shrinkage and porosity of the layers can be controlled and fine-tuned, and further to provide multilayer structures obtainable with said method which for instance may be used in solid oxide fuel cells.

BRIEF DESCRIPTION OF THE INVENTION

Said object is achieved by a method for producing a multilayer structure, comprising the steps of:
 providing a composition comprising a Fe—Cr alloy powder and at least one of the oxides of Fe, Cr, Ni, Co, Zn, Cu;
 forming a first layer of said composition;
 forming at least one additional layer on one side of said first layer;
 heat treating said layers in an oxygen-containing atmosphere; and
 sintering in a reducing atmosphere so as to provide a final alloy,
  wherein the amount of Fe in the final alloy of the first layer after the sintering step is in the range of from about 50-90% by weight, based on the total weight of the final alloy.

Said object is further achieved by a multilayer structure, obtainable by said process, and a solid oxide fuel cell, comprising said multilayer structure.

Said object is moreover achieved by a method for producing a metallic structure, comprising the steps of:
 providing a composition comprising a Fe—Cr alloy powder and at least one of the oxides of Fe, Cr, Ni, Co, Zn, Cu;
 forming a layer of said composition;
 forming at least one additional layer on one side of said layer;
 heat treating said layers in an oxygen-containing atmosphere; and
 sintering in a reducing atmosphere so as to provide a final alloy,
  wherein the amount of Fe in the final alloy of the layer after the sintering step is in the range of from about 50-90% by weight, based on the total weight of the final alloy.

Furthermore, said object is achieved by a metallic structure, obtainable by said method, and a solid oxide fuel cell, comprising said metallic structure.

Said object is finally achieved by a method for shrinkage and porosity control during sintering of multilayer structures by means of producing porous membrane structures by means of Fe—Cr alloy powders and oxides of Fe, Cr, Ni, Co, Al, V, Ni, Mo, W, Re or Ti and oxides of Fe, Cr, Ni, Co, Zn, Mn, Cu, characterised by said powders being mixed so that Fe/(Fe+Cr) is in the range of 50-90%, a suspension of said powders being produced by means of solvents, surfactants and binders, pore formers possibly being added in order to obtain porosity, and if the product to be produced by means of the suspension is to be dense, sintering aids may be added at appropriate sites, the suspension being tape-cast, extruded, rolled or the like, and heat treated in an oxygen containing atmosphere for burn out of organic components and sintered in highly reducing environments such as a reducing atmosphere for reducing to Fe, Ni, Co and possibly also Cr so that the oxides of Fe, Ni, Co and Cr are at least partly reduced to metallic states reacting with the Fe—Cr powder.

Preferred embodiments are set forth in the subclaims.

The final shape, function as well as mechanical integrity of the multilayer component are dependant of the shrinkage of each individual layer. With the present invention the shrinkage of layers in a multilayer component can be adjusted by the volume change associated by the reduction of added metal oxide(s).

FIGURES

The invention will in the following be explained with reference to the Figures wherein.

DETAILED DESCRIPTION OF THE INVENTION

Figure 1:
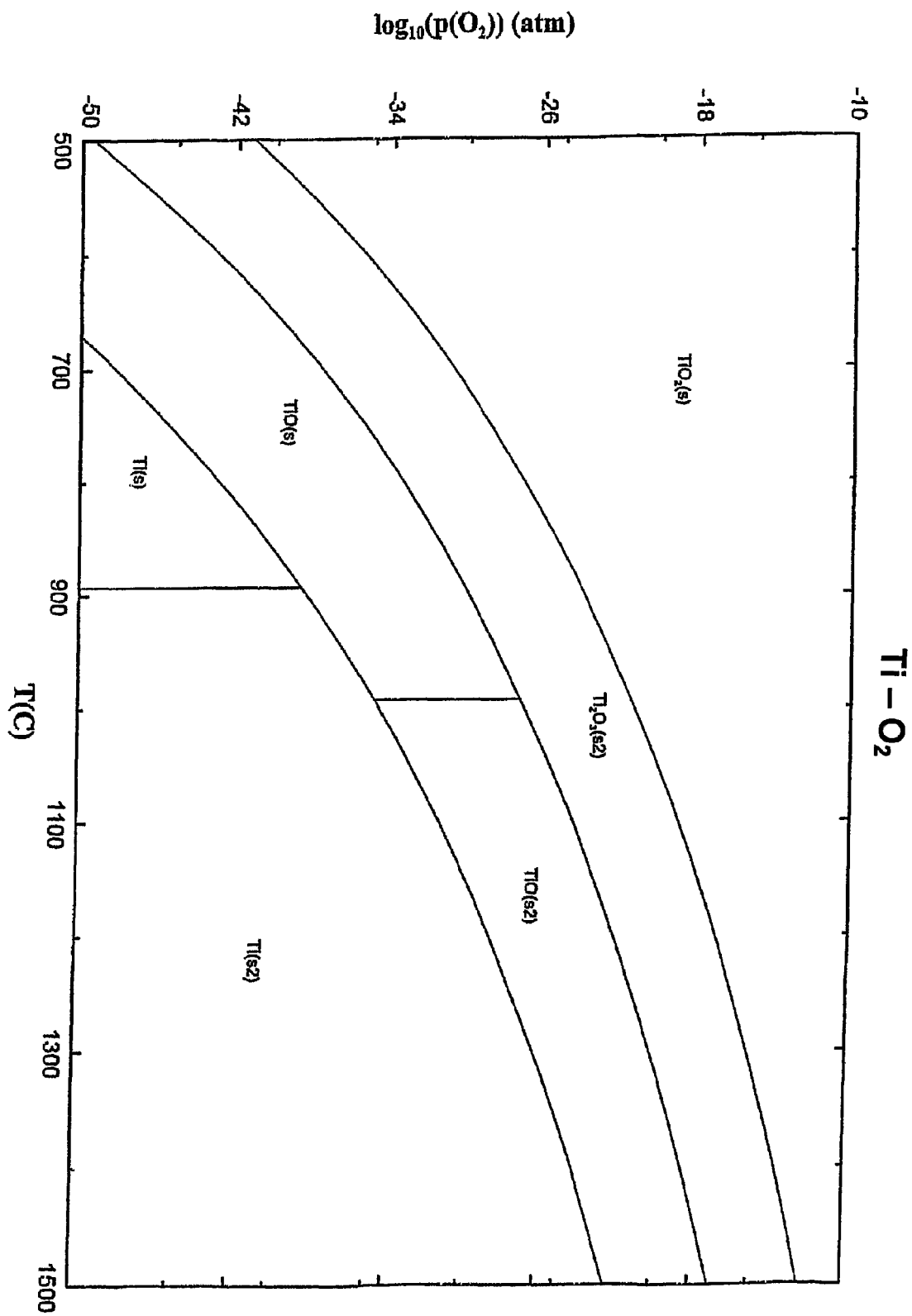
FIG. 1 illustrates the $P_{O2}$ versus temperature curve for a Ti—$TiO_2$ equilibrium.

In the following, the invention will be described in more detail.

The method of the present invention relates to the production of multilayer structures for, for example, solid oxide fuel cells. The method is characterised by providing a composition comprising a Fe—Cr alloy powder and at least one of the oxides of Fe, Cr, Ni, Co, Zn, Cu, wherein the amount of Fe in the final alloy of the first layer after the sintering step is in the range of about 50-90% by weight, based on the total weight of the final alloy. Preferably, the amount of Fe is in the range of in the range of about 70-85% by weight, and more preferred in the range of about 70-80% by weight. The final alloy is formed by reaction of metal obtained by the reduction of the metal oxide with the Fe—Cr alloy powder during the sintering step.

The first layer of the multilayer structure comprises, after the sintering step, the final alloy, but may also comprise not reduced oxides in case the reduction of the oxides has not been carried out completely. Such a partial reduction can be carried out by adjusting the sintering parameters, on the basis of the common knowledge of the skilled person. Furthermore, as will be explained below, the layer may also comprise other metal oxides which are not reduced at all, as well as other additives.

The Fe—Cr alloy powder is contained in the composition in an amount of from about 60 to 99 wt %, preferably in an amount of from about 80 to about 99 wt %, and more preferred in an amount of from about 90] to about 99, based on the total amount of metal alloy and oxides.

The Fe—Cr alloy may preferably further comprise a metal selected from Ni, Co, Al, V, Ni, Mo, W, Re, Ti, or mixtures thereof. In another preferred embodiment, additional metal oxides may be added to the composition. Suitable oxides are selected from oxides of V, La, Zr, Ce, Y, Ti, Nb, Sr, Hf, Mg, Al, Ca and Mn. Said additional oxides may act as sintering aids and remain in their oxide form. They also improve the electrical conductivity through phases formed at grain boundaries in the layer, and moreover enhance the corrosion resistance during use. Said additional oxides may be added to the composition in amounts of from about 0 to about 15 wt %, preferably from about 0 to about 5 wt %, and more preferably from about 0 to 2 wt %. The lower limit in each case preferably is, if the additional oxides are present, about 0.1%, more preferably 0.5 wt %.

Furthermore, the composition may comprise metal powders in addition to the alloy powder and the metal oxide. Examples of suitable metals are Al, Mg or Ti powder. The metal powder advantageously reduces the metal oxides of the composition, thereby being oxidized itself. A basic requirement for the added metal powder is an additional overall volume reduction of the layer due to the reduction of the oxides. The amount of metal powder will vary so as to fine-tune the shrinkage of the layer. Typical amounts thereof are in the range of from about 1 to about 40 vol %.

Said metal powders and oxides of the composition are preferably mixed with a solvent to form a suspension. Said suspension may then be used to form a first layer via tape casting, or extrusion. The suspension may also comprise additives, such as surfactants and binders. Moreover, in order to obtain a porous layer, the suspension my comprise pore formers, such as C-particles/fibres or corn flower. If a dense solid layer is desired, sintering aids may be added. The suspension may comprise said additives in amounts of from about 0 to about 20 wt %, based on the total weight of the suspension.

The composition is used to form a first layer, as mentioned above. The thickness of the formed layer is usually in the range of from about 20 to about 2000 μm, with from about 40 to about 1000 μm being preferred. The layer may be formed as a flat layer, or may alternatively be extruded into a tube-shaped layer. Said tubes may additionally be strengthened by an internal structure and are preferably used in SOFC applications.

After the formation of the first layer of said composition, at least one other layer on one side of the first layer is formed. In a preferred embodiment, the at least one additional layer is formed from the above described composition, but differs from the first layer in the chemical constitution of said composition and/or at least one property selected from the porosity and shrinkage. A different porosity is for instance achieved by alteration of the amount of pore formers added. In a more preferred embodiment, some additional layers are formed form said composition, all being different from the each other in the chemical constitution of said composition and/or at least one property selected from the porosity and shrinkage. For example, if the first layer comprises a relatively large amount of pore formers, while each of the following layers applied thereon has a reduced amount of pore formers, a multilayer structure is obtained having a graded porosity. Advantageously, the porosity of each layer can be exactly designed as needed for the desired later application, with as many layers as necessary.

If the multilayer structure is to be used in SOFC applications, one of the at least one additional layers is preferably an electrode layer. Said electrode layer may be directly applied on the first layer, but may also be applied on one side of a graded multilayer structure as described above. Furthermore, an electrolyte layer may be formed on top of said electrode layer if desired. In a more preferred embodiment, said electrode layer is an anode layer.

In a preferred embodiment, the at least one additional layer comprises a layer which is formed from the above described composition, differing from the first layer in the chemical constitution of said composition and/or at least one property selected from the porosity and shrinkage, an electrode layer and an electrolyte layer in this order.

The electrolyte layer may preferably comprise doped zirconia, doped ceria, or a doped gallate electrolyte.

Said electrode and electrolyte layers may be applied with methods known in the art, for example, by spray painting.

After the formation of all desired layers, the structure is heat-treated in an oxygen-containing atmosphere so as to burn out any organic components. The heat treatment is preferably performed at temperatures in the range of from about 300-600° C., and more preferred in the range of from about 350-500° C.

Afterwards, the multilayer structure is sintered in a controlled, highly reducing atmosphere so as to reduce the respective oxides at least partially to their metallic form and to react them with the Fe—Cr alloy powder so as to form a final alloy powder. The sintering step is preferably performed at temperatures in the range of from about 900 to about 1500° C., and more preferred in the range of from about 1000 to about 1300° C. During this step, the speed of the temperature increase, the sintering time and/or and/or the $P_{O2}$ of the reducing atmosphere can be adjusted so as to control the reduction rate of the oxides being present in the composition. If, for example, a complete reduction of $Cr_2O_3$ at, for instance about 1300° C., is desired, the oxygen partial pressure has to be particularly low. If needed, an oxygen getter may thus be added to the gas stream, such as a Ti sponge.

Figure 2:
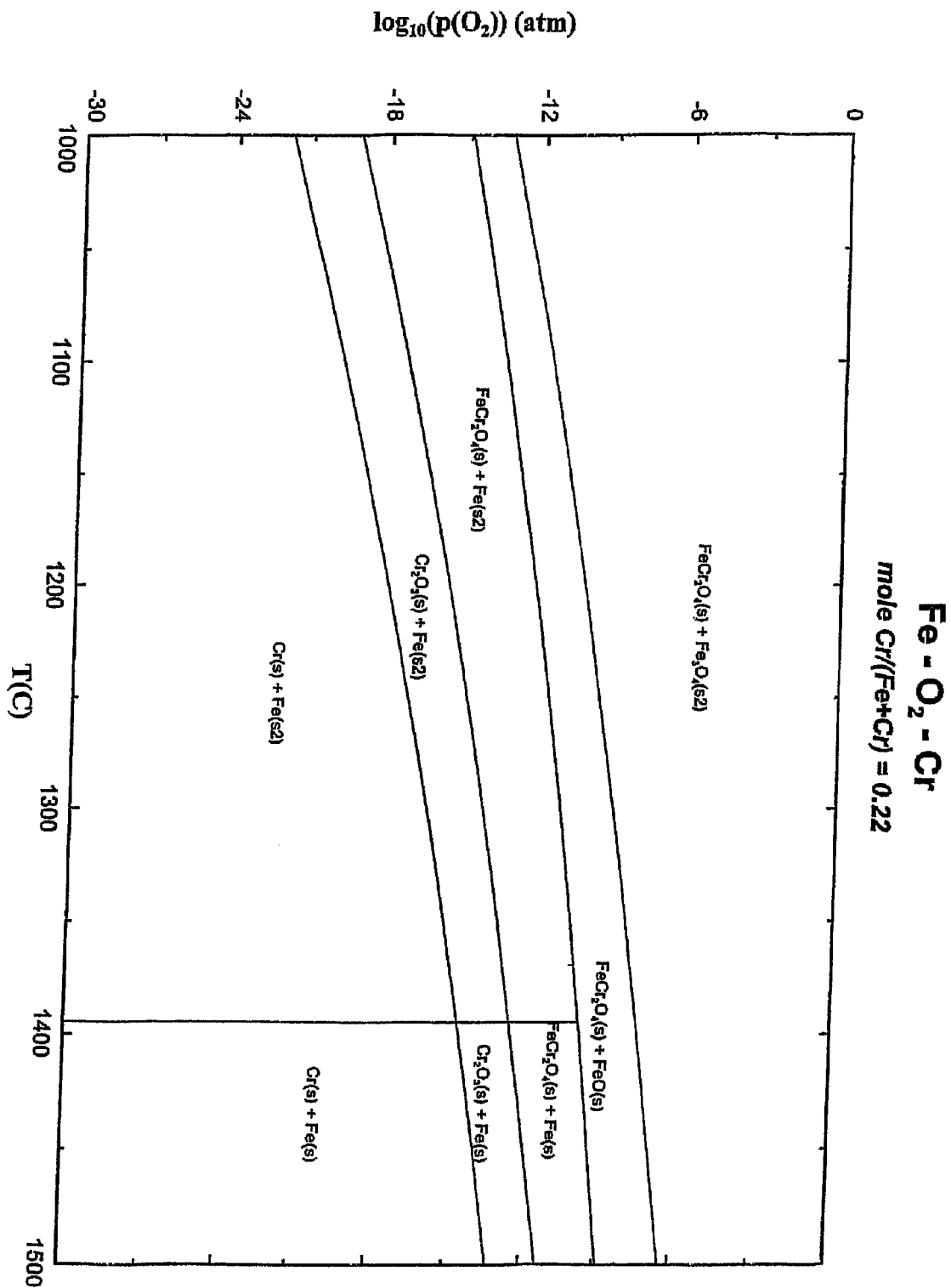
FIG. 2 illustrates the $P_{O2}$ versus temperature curve for Cr, Fe, $FeCr_2O_4$.

FIGS. 1 and 2 illustrate the relationship of $P_{O_2}$ and the temperature (for T-TiO$_2$ equilibrium in FIG. 1, and for Cr, Fe, FeCr$_2$O$_4$ equilibrium in FIG. 2). During the sintering step, the $P_{O_2}$ is adjusted accordingly to the desired degree of reduction of the oxides in the composition.

In a preferred embodiment, the first layer has a total linear shrinkage of about 5-40%, and more preferably of about 15-25%.

In another embodiment, the present invention provides a method for producing a metallic structure, comprising the steps of:
  providing a composition comprising a Fe—Cr alloy powder and at least one of the oxides of Fe, Cr, Ni, Co, Zn, Cu;
  forming a layer of said composition;
  heat treating said layer in an oxygen-containing atmosphere; and
  sintering in a reducing atmosphere; so as to provide a final alloy,
    wherein the amount of Fe in the final alloy of the layer after the sintering step is in the range of from about 50-90% by weight, based on the total weight of the final alloy.

The obtained metallic structure may be used as a support layer for electrodes which may be used, for example, in solid oxide fuel cells. For instance, electrode layers and an electrolyte layer may be applied on said metallic structure, as outlined above.

Preferred embodiments of the method for producing a metallic structure include the above mentioned preferred embodiments of the method for producing a multilayer structure.

During the sintering step, the speed of the temperature increase up to the desired sintering temperature, and also the $P_{O_2}$ can be adjusted so as to control the shrinkage profile of the layer. If, for example, a complete reduction of Cr$_2$O$_3$ at, for instance about 1300° C., is desired, the oxygen partial pressure has to be particularly low. If needed, an oxygen getter may therefore be added to the gas stream, such as a Ti sponge.

The above described multilayer and metallic structure, obtainable with the process of the invention, may for example be employed in a SOFC. In this case, the preferred multilayer structure comprises a first layer formed with said composition, an electrode layer and an electrolyte layer. If the electrode layer of the multilayer structure is an anode layer, the SOFC may further comprise a cathode layer, preferably a cathode layer on a perovskite basis, for instance strontium doped lanthanum manganate (La$_{1-x}$Sr$_x$Mn$_y$O$_3$) or mixed ionic and electronic conductors, such as strontium doped lanthanum ferrite (La$_{1-x}$Sr$_x$Fe$_y$O$_3$).

The above described multilayer structure and metallic structure may also be used for other applications, such as membranes.

The method according to the invention of producing porous membrane structures for among other fuel cells is characterised by said powders being mixed so that Fe/(Fe+Cr) is in a range of 50-90 at %, a suspension of said powders for tape casting, extrusion or rolling being produced by means of solvents, surfactants and binders, pore formers possibly being added in order to obtain porosity, and if the product to be produced by means of the suspension is to be dense, sintering aids may be added at appropriate sites, the suspension being tape-cast, extruded, rolled or the like and heat treated in an oxygen containing atmosphere for burn out of organic components and sintered in a highly reducing atmosphere for reducing to Fe, Ni, Co and possibly also to Cr so that the oxides of Fe, Ni, Co and Cr are at least partly reduced to metallic states reacting with the Fe—Cr powder. As a result, the requirements to TEC, corrosion resistance etc. are fulfilled.

According to the invention oxides of elements such as V, Ca, Zr, Ce, Y, Ti, Nb, Sr, Hf, La, Mg, Al, Mn may be added. These additional oxides will remain as oxides during processing as well as operation of the component may act as sintering aids providing stable coats and scales on the particles during the processing. They can also improve the electrical conductivity through phases formed at grain boundaries and enhance the corrosion resistance.

The method may further be characterised by an extrusion so as to produce tubes possible strengthened by an internal structure. Such a material is suitable for among other SOFCs.

According to the invention the alloy/oxide powders may be mixed in proportions ensuring an additional linear sintering shrinkage due to oxide to metal reduction up to 60%. The sintering shrinkage comprises normal sintering features like grain growth and pore elimination as well as volume reduction due to a controlled oxide to metal reduction.

The method may further comprise a number of steps in which the temperature ramp and $P_{O_2}$ is varied so as to control the shrinkage profile. In case of fully reduction of Cr$_2$O$_3$ at for instance 1300° C. the oxygen partial pressure has to be particularly low. This may according to the invention by achieved by means of an oxygen getter in the as stream, for instance a Ti sponge.

FIGS. 1 and 2 of the drawings illustrate how $P_{O_2}$ could be varied in response to the temperature (for T-TiO$_2$ equilibrium and for Cr, Fe, FeCr$_2$O$_4$ equilibrium).

Special embodiments will be described in the following:

Powders of Fe, Cr alloy including minor portions of alloying elements such as Al, Ni, Co, Mo, W, RE or Ti and oxides of Fe, Cr, Ni, Co, Zn, Mn, Cu are mixed so that Fe/(Fe+Cr) is in a range of 50-90%, preferably in the range of 70-85% and especially in the range of 70-80% (ratio as mentioned previously). A paste of said mixture is pre-pared by means of solvents, surfactants and binders. Pore formers such as C-particles/fibres Corn flower may be added in order to obtain appropriate porosity of the product produced by means of said paste. If at least a part of the product is to be dense, appropriate sintering aids may be added at appropriate sites, e.g. forming a graded structure. The mixture is thereafter tape cast, extruded, rolled or the like to provide a green product. The green product is thereafter heat-treated in an oxygen containing atmosphere for burning of organic components, thereafter sintered in a highly reducing atmosphere for reducing the oxides to Fe, Ni, Co, and partly also Cr, such that the oxides are at least partly reduced to metallic state. The metallic atoms thereafter react with the powder of Fe, Cr alloy which also may have been partly oxidized and thereafter at least partly reduced during the heat treatment so as to obtain an alloy having a proper composition so that the requirements as to TEC, corrosion resistance etc. are fulfilled. The heat treatment in an oxygen containing atmosphere is performed at temperatures up to 300-600° C. preferably up to 500° C. Oxides of elements such as V, Ca, Ce, Y, Ti, Nb, Sr, Zr, Hf, La, Mn, Al, Mg may be added to facilitate the formation of stable coats and scales on the particles during processing and operation. Dependent on the actual element, these elements may improve the electrical conductivity through grain boundaries, enhance corrosion resistance and reduce the evaporation of Cr species.

Alloy/oxide powders are mixed in appropriate proportions so as to obtain a total linear shrinkage of 5-40%, preferably 15-25%. The sintering shrinkage comprises normal sintering features like grain growth and pore elimination as well as volume reduction due to controlled oxide to metal reduction. A suspension is made using an organic binder and a 200-1000μ thick support layer is subsequently formed by tape casting.

After drying (removal of solvent) an SOFC anode and an electrolyte are deposited onto the green tape by spray painting. The linear shrinkage of the support is matched to that of the anode and the electrolyte layer by adjusting the metal oxide/metal ratio of the starting powder mixture. The sintering procedure comprises removal of organics <500° C. in oxidising atmospheres followed by sintering under reducing conditions in a hydrogen/containing atmosphere. A cathode layer is finally deposited onto the sintered package comprising the support layer, the anode and the electrolyte. The cathode may be consolidated by a sintering step.

The sintering of a structure of the above-mentioned type may comprise multiple steps in which the temperature ramp and $P_{O_2}$ is varied so as to exactly control the shrinkage profile during the sintering. In case of a fully reduction of $Cr_2O_3$ at for instance 1300° C. the oxygen partial pressure has to be particularly low. This may be achieved by use of an oxygen getter in the gas stream for instance a Ti sponge.

Graded structures, composition or porosity for instance, can be produced by a process during which a number of layers with the desired changing properties e.g. TEC, porosity and micro structure are consolidated by rolling.

Alternatively, it is possible to mix oxide and metal so that the oxygen ions change position, for instance by mixing Fe—O and Al-metal, which can be heated to Fe-metal and Al oxide, and possibly in vacuum. Metals, which can be added in order to reduce other oxides are for instance Al and Mg. A requirement of the metals, which should be used for reduction according to this principle, is that the overall change of volume due to movement of the oxygen atoms of one metal to another causes a reduction in volume. However, we do not rule out a reduction of metal oxide to metal by means of a low oxygen partial pressure. It is therefore avoided that the mixture proportion between for instance Ni and Al has to be very precise. Metals, which can be added in order to reduce other oxides, can be selected depending on whether they offer additional advantages, such as adaption to thermal expansive coefficient (TEC). For instance $Al_2O_3$ has a low TEC while MgO has a high TEC. These substances can be added in appropriate quantities and in appropriate ratios so that the final product obtains a required TEC where TEC between a porous support and the other layers is adapted.

In the below table calculated changes of volume are stated per mol metal at reduction respectively at oxidation.

| Phase/element | V'V/mol (cm3/mol) | deltaV" = (Vo – Vm)/Vm(%) | deltaV''' = (Vm – Vo)/Vo(%) | Mole-weight (g/mol) | Density (g/cm3) |
|---|---|---|---|---|---|
| Mg | 14.0 | −19.9 | | 24.3 | 1.74 |
| MgO | 11.2 | | 24.8 | | |
| Al | 10.0 | 26.9 | | 27.0 | 2.70 |
| ½Al2O3 | 12.7 | | −21.2 | | |
| Ti | 10.6 | 88.0 | | 47.9 | 4.51 |
| TiO2 | 20.0 | | −46.8 | 79.9 | 4.00 |
| Cr | 7.2 | 102.0 | | 52.0 | 7.19 |
| ½Cr2O3 | 14.6 | | −50.5 | | |
| Mn | 7.3 | | | 54.9 | 7.47 |
| MnO | | | | 70.9 | |
| Fe | 7.1 | 120.0 | | 55.8 | 7.87 |
| ½Fe2O3 | 15.6 | | −54.6 | 159.7 | 5.12 |
| Co | 6.7 | 140.5 | | 58.9 | 8.80 |

-continued

| Phase/element | V'V/mol (cm3/mol) | deltaV" = (Vo – Vm)/Vm(%) | deltaV''' = (Vm – Vo)/Vo(%) | Mole-weight (g/mol) | Density (g/cm3) |
|---|---|---|---|---|---|
| ½Co2O3 | 16.1 | | −58.4 | | |
| Ni | 6.6 | 57.4 | | 58.7 | 8.91 |
| NiO | 10.4 | | −36.5 | 74.7 | 7.20 |
| Cu | 7.1 | | | 63.5 | 8.93 |
| CuO | | | | | |

As it appears from the table, volume per metal at Mg and Al oxidations is changed respectively −20% and +27%. At reduction (from oxide to metal) the volume/metal for Cr, Fe, Co and Ni is changed, respectively −50, −55, −58 and −36%, i.e. according to this method a considerable reduction in volume is achieved. Added oxides may possibly act as sintering aids.

Added oxides can furthermore react with scale of for instance Cr-metal (i.e. with $Cr_2O_3$) so that electric conducting oxides are generated (for instance perovskites such as doped $LaCrO_3$ or $LaMnO_3$ which are capable of connecting FeCr-alloy particles electronically and mechanically. Simultaneously they act protective to corrosion.

In addition small quantities of rare earths are added in order to improve the corrosion resistance of the porous structure.

The present invention further provides in embodiments:

(1) A method for shrinkage and porosity control during sintering of structures by means of producing porous membrane structures by means of Fe—Cr alloy powders and oxides of Fe, Cr, Ni, Co, Al, V, Ni, Mo, W, RE or Ti and oxides of Fe, Cr, Ni, Co, Zn, Mn, Cu characterised by said powders being mixed so that Fe/(Fe+Cr) is in the range of 50-90%, a suspension of said powders being produced by means of solvents, surfactants and binders, pore formers possibly being added in order to obtain porosity, and if the product to be produced by means of the suspension is to be dense, sintering aids may be added at appropriate sites, the suspension being tape-cast, extruded, rolled or the like, and heat treated in an oxygen containing atmosphere for burn out of organic components and sintered in highly reducing environments such as a reducing atmosphere for reducing to Fe, Ni, Co and possibly also Cr so that the oxides of Fe, Ni, Co and Cr are at least partly reduced to metallic states reacting with the Fe—Cr powder.

(2) A method according to (1), characterised by an enhanced volume reduction being provided by mixing the elements in claim 1 e.g. Fe—O with Al-metal which during heating forms Fe-metal and Al oxide.

(3) A method according to (1) characterised by an enhanced volume reduction being provided by adding other metals such as Mg in order to reduce other oxides.

(4) A method according to (1) characterised by an enhanced volume reduction being provided by adding other metals such as Ti in order to reduce other oxides.

(5) A method according to (1), characterised by adding non-reducing elements such as Ti, Nb, Sr, Zr, Hf, La, Y, Ca, Ce and Al, Mg, V, Mn.

(6) A method according to (1) or (4), characterised by an extrusion so as to produce tubes possibly strengthened by an internal structure.

(7) A method according to any of (1) to (6), characterised by the alloy/oxide powders being mixed in proportions ensuring a linear sintering shrinkage of 5-40%, typically in the range of 10-30% and preferably in the range of 15-25%

(8) A method according to any of (1) to (7) comprising a number of steps where the temperature ramp and $PO_2$ is varied so as to control the shrinkage profile.
(9) A method according to any of (1) to (8), characterised by adding an oxygen getter to the gas stream.
(10) A method of producing porous membrane structures for fuel cells by means of the method according to any of (1) to (9).
(11) A method of manufacturing a fuel cell according to (10), characterised by using zirconia or ceria-NiO based anodes or mixed ionic and electronic conductive materials.
(12) A method of manufacturing a fuel cell according to (10), characterised by using doped zirconia, doped ceria or doped gallate electrolytes or protonic conductors.
(13) A method of manufacturing a fuel cell such as a SOFC using perovskite based cathodes, for instance strontium doped lanthanum manganate ($La_{1-x}Sr_xMn_yO_3$) or mixed ionic and electronic conductors such as strontium doped lanthanum ferrite ($La_{1-x}Sr_xFe_yO_3$)
(14) Graded structure manufactured by a lamination method according to any one of the above by which a number of layers having the desired changing properties are consolidated by rolling.

In the following, the invention will be illustrated by Examples. Alternative embodiments and examples exist without departing from the scope of the present invention.

EXAMPLES

Example 1

Manufacture of a Flat Plate Structure with Graded Porosity

Layer 1: $FeCr_{0.23}Ni_{0.02}Mn_{0.01}$ alloy powder with an average particle size of 20 microns was mixed with $Fe_2O_3$ ($d_{50}$ about 1 micron) and $Cr_2O_3$ ($d_{50}$ about 1 micron) in a weight ratio of 90:7:3. 15 vol % PMMA spheres ($d_{50}$ about 5 microns) were added as pore formers. After mixing, a suspension was made by ball milling, using an organic binder system. With the so formed suspension, a 500 micron thick sheet was formed by tape-casting.

Layer 2: A suspension was made as described above using $FeCr_{0.23}Ni_{0.02}Mn_{0.01}$ alloy powder with an average particle size of 5 microns. The suspension was tape-casted directly onto layer 1.

After drying, the multilayer structure was heat treated in air at about 450° C. for about 1 hour with a temperature increase of about 50° C./h for burn out of the organic binder. The sample was subsequently heat treated under reducing conditions at 1200° C. for about 4 hours with a temperature increase of about 75° C./h in an 7H2Ar mixture. A constant $pO_2$ was ensured by passing the gas through a titanium sponge at about 1200° C.

The so formed component had a significantly higher porosity in layer 1. The component was completely flat after sintering due to the matching in sintering shrinkage as achieved by the reduction and alloying of the Fe- and Cr-oxides in layer 1.

Example 2

Manufacture of a Flat Plate SOFC Cell

Layer 1: $FeCr_{0.20}Ni_{0.02}Mn_{0.01}Ti_{0.04}$ alloy powder with an average particle size of about 25 microns was mixed with $Fe_2O_3$ ($d_{50}$ about 1 micron) and $Cr_2O_3$ ($d_{50}$ about 1 micron) in a weight ratio of 87:9:4. 20 vol % PMMA spheres ($d_{50}$ about 10 microns) were added as pore formers. After mixing a suspension was made by ball milling using an organic binder system. The so formed suspension was formed in to a 300 micron sheet by tape-casting.

Layer 2: $FeCr_{0.20}Ni_{0.02}Mn_{0.01}Ti_{0.04}$ alloy powder with an average particle size of about 10 microns was mixed with $Fe_2O_3$ ($d_{50}$ about 1 micron) and $Cr_2O_3$ ($d_{50}$ about 1 micron) in a weight ratio of 91:6:3. 10 vol % PMMA spheres ($d_{50}$ about 5 microns) were added as pore formers. After mixing a suspension was made by ball milling using an organic binder system. The so formed suspension was tape cast on top of layer 1 in a thickness of about 150 microns by tape-casting.

Layer 3. A 20 micron thick anode layer was deposited by spray painting a suspension made by NiO and Yttria stabilized zirconia (10 YSZ) in the weight ratio of 3:2. The suspension was made with an organic binder system using ball milling.

Layer 4. Finally, a 20 micron thick yttria stabilised zirconia electrolyte (10 YSZ) layer was deposited on top of Layer 3 by spray painting.

After drying the multilayer structure was heat treated in air at about 450° C. for about 1 hour with a temperature increase of about 50° C./h) for burn out of the organic binder. The sample was subsequently heat treated under reducing conditions at about 1250° C. for about 6 hours with a temperature increase of about 50° C./h in an 7H2Ar mixture. A constant $pO_2$ was ensured by passing the gas through a titanium sponge at 1250° C.

The SOFC cell was completed after sintering by applying a cathode by spray painting on top of the multilayer structure.

The multilayer structure was completely flat after sintering.

It should be further apparent to those skilled in the art that various changes in form and detail of the invention as shown and described above may be made. It is intended that such changes be included within the spirit and scope of the claims appended hereto.

The invention claimed is:
1. A method for producing a multilayer structure, comprising the steps of:
   providing a composition comprising a Fe—Cr alloy powder and at least one of the oxides of Fe, Cr, Ni, Co, Zn, Cu;
   forming a first layer of said composition;
   forming at least one additional layer on one side of said first layer;
   heat treating said layers in an oxygen-containing atmosphere; and
   sintering in a reducing atmosphere so as to provide a final alloy,
   wherein the amount of Fe in the final alloy of the first layer after the sintering step is in the range of from about 50-90% by weight, based on the total weight of the final alloy.
2. The method of claim 1, wherein the composition further comprises at least one oxide of V, Zr, Ce, Y, Ti, Nb, Sr, Hf, La, Mg, Al, Ca, and Mn.
3. The method of claim 1, wherein the Fe—Cr alloy further comprises a metal selected from Ni, Co, Al, V, Ni, Mo, W, Re, Ti, and mixtures thereof.
4. The method of claim 1, wherein the composition further comprises a metal powder selected from Al, Mg and Ti.
5. The method of claim 1, wherein the first layer formed of said composition has a linear sintering shrinkage of about 5-40%.

6. The method of claim 1, wherein the at least one additional layer is formed from said composition, and wherein said at least one additional layer differs from the first layer in the chemical constitution of said composition, at least one property selected from the porosity and shrinkage, or a combination thereof.

7. The method of claim 1, wherein one of the at least one additional layers is an electrode layer.

8. The method of claim 7, further comprising the formation of an electrolyte layer on top of the electrode layer.

9. The method of claim 7, wherein the at least one additional layer is an anode layer.

10. The method of claim 1, wherein the at least one additional layer comprises a layer which is formed from said composition, differing from the first layer in the chemical constitution of said composition, at least one property selected from the porosity and shrinkage, or a combination thereof, an electrode layer and an electrolyte layer in this order.

* * * * *